US007251422B2

(12) United States Patent
Tokuyama et al.

(10) Patent No.: US 7,251,422 B2
(45) Date of Patent: Jul. 31, 2007

(54) IMAGE CORRECTION METHOD AND IMAGE FORMING APPARATUS

(75) Inventors: Mitsuru Tokuyama, Kyoto (JP); Toshiaki Ino, Kyoto (JP); Kiyofumi Morimoto, Nara (JP); Takashi Kitagawa, Nara (JP); Yasuhiro Nishimura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 147 days.

(21) Appl. No.: 11/084,493

(22) Filed: Mar. 18, 2005

(65) Prior Publication Data

US 2005/0214005 A1 Sep. 29, 2005

(30) Foreign Application Priority Data

Mar. 25, 2004 (JP) ............................ 2004-090047

(51) Int. Cl.
*G03G 15/00* (2006.01)
*H04N 1/407* (2006.01)

(52) U.S. Cl. .......................... 399/49; 358/406; 399/46; 399/72

(58) Field of Classification Search .................. 399/49, 399/72, 50, 51, 53, 55, 46; 358/406, 504
See application file for complete search history.

(56) References Cited

U.S. PATENT DOCUMENTS 6,185,386 B1 * 2/2001 Noguchi ...................... 399/49
2002/0041769 A1 * 4/2002 Nakai et al. .................. 399/49
2002/0176102 A1 * 11/2002 Denton et al. .......... 358/406 X
2004/0081476 A1 * 4/2004 Hama .......................... 399/49
2004/0105691 A1 * 6/2004 Hama et al. .................. 399/49

FOREIGN PATENT DOCUMENTS

JP 08-211722 8/1996
JP 2001-125325 5/2001
JP 2001-309178 11/2001
JP 2002-044455 A * 2/2002

* cited by examiner

*Primary Examiner*—Sophia S. Chen
(74) *Attorney, Agent, or Firm*—Renner, Otto, Boisselle & Sklar, LLP

(57) ABSTRACT

One embodiment of an image correction method is an image correction method for correcting image forming condition (s). The image correction method includes forming, on photoreceptor(s), correction test pattern(s) having continuously varying toner gradation; wherein a single correction test pattern in which density is varied in sequence from high to low in paper transport direction(s) is formed as a result of controlling exposing unit laser power(s) while photoreceptor charging potential(s) is/are held constant, or while develop bias(es) is/are held constant, or while photoreceptor charging potential(s) is/are held constant and develop bias(es) is/are held constant. In such case, total length(s) in paper transport direction(s) of such correction test pattern(s) is/are less than or equal to circumference(s) of photoreceptor(s).

20 Claims, 6 Drawing Sheets

IMAGE CORRECTION METHOD AND IMAGE FORMING APPARATUS

CLAIM(S) IN CONNECTION WITH APPLICATION(S) AND/OR PRIORITY RIGHTS(S)

This application claims priority under 35 USC 119(a) to Patent Application No. 2004-090047 filed in Japan on 25 Mar. 2004, the content of which is hereby incorporated herein by reference in its entirety.

BACKGROUND OF INVENTION

1. Field of the Invention

The present invention relates to an image correction method for forming correction test pattern(s) having continuously varying toner gradation on photoreceptor(s) to correct image forming condition(s), and relates to an image forming apparatus carrying out such image correction method.

2. Related Art

Gradation reproduceability which is such that tonal gradation is faithfully reproduced from highlight to shadow in reproduced images is demanded from copiers, printers, facsimile machines, and other such image forming apparatuses carrying out electrophotographic image formation processing. However, gradation in the images which are formed will vary with changes in the optical density of toner serving as developer, changes in process conditions that have been set for image formation, and so forth.

As means for improving gradation reproduceability, methods of carrying out gradation correction (γ correction) processing at times associated with certain events have therefore been adopted.

Gradation correction processing, for faithfully reproducing the tonal gradation of the image serving as original, may be carried out as follows.

A plurality of test pattern latent images, having different exposure intensities corresponding to different prescribed densities, are first formed at prescribed intervals in the paper transport direction on a photoreceptor. These test pattern latent images are then developed, at which time develop roller surface speed is held constant. Optical density of toner in the respective test pattern images produced as a result of develop is then detected, and a gradation correction curve is created based on the toner density data produced as a result of detection.

FIG. 4(*b*) shows examples of conventional test pattern images.

Existing test patterns (gradation patterns) ordinarily comprise on the order of three to ten (five at FIG. 4(*b*)) different gradation fields 101*a* through 101*e*, the respective fields that are formed being sufficiently large in size to accommodate mechanical fluctuations and so forth.

However, with such conventional test patterns, because it is sometimes the case that there will be density nonuniformities within a field due to mechanical fluctuations and so forth, density measurements are usually carried out over a prescribed region (at FIG. 4(*b*), circular region 102 enclosed by the dashed line) within the field. And this has resulted in the problem that density measurements are time-consuming and much toner is consumed.

An image forming apparatus has therefore been proposed (see, e.g., Japanese Patent Application Publication Kokai No. H8-211722 (1996); hereinafter "Patent Reference No. 1") in which develop bias is continuously varied within the region of a single test pattern so as to reduce the size of the region occupied by the overall test pattern as compared with the conventional situation shown at FIG. 4(*b*), permitting reduction in the amount of toner consumed and reduction in the amount of time required for measurements.

In this image forming apparatus, to avoid instability in toner density when varying develop bias in stepwise fashion, photoreceptor charging potential and develop bias are continuously varied as a single test pattern, in which gradation varies continuously in the paper transport direction (scan direction), is formed. This permits the foregoing object, i.e., reduction in the amount of toner consumed and reduction in the amount of time required for measurements, to be achieved.

Now, in the aforementioned Patent Reference No. 1, correction of image forming conditions is carried out by forming a single test pattern in which gradation varies continuously and by measuring the density of this test pattern.

However, when actually carrying out image formation processing, the image forming apparatus does not produce density variation in images by varying photoreceptor charging potential or develop bias, but produces density variation in images by controlling light intensity from exposure means while holding photoreceptor charging potential and develop bias constant at appropriate values. For this reason, there has been the problem that even where correction of image forming conditions is carried out after the fashion of the aforementioned Patent Reference No. 1, correction will not necessarily be suitable or appropriate for the situation existing during actual usage.

SUMMARY OF INVENTION

It is an object of the present invention to provide image correction method(s) permitting highly accurate correction of image forming condition(s) as a result of formation of test pattern(s) appropriate for situation(s) existing during actual usage, and to provide image forming apparatus(es) carrying out such image correction method(s).

In accordance with one or more embodiments of the present invention, an image correction method for correcting one or more image forming conditions comprises forming, on one or more photoreceptors, one or more correction test patterns having continuously varying toner gradation; wherein at least one of the correction test pattern or patterns is formed as a result of controlling at least one exposure device while at least one photoreceptor charging potential is held constant, or while at least one develop bias is held constant, or while at least one photoreceptor charging potential is held constant and at least one develop bias is held constant.

By thus controlling at least one of the exposure device(s) while at least one of the photoreceptor charging potential(s) and/or at least one of the develop bias(es) is/are held constant, it is possible to form at least one of the correction test pattern(s) at condition(s) appropriate for situation(s) existing during actual image forming apparatus use. Furthermore, employment of test pattern(s) having continuous gradation(s) permits reduction in amount of toner consumed and increased accuracy of correction.

In such case, it is preferred that at least one of the correction test pattern or patterns be such that recording thereof proceeds in order from high density to low density. That is, at least one of the correction test pattern(s) might, for example, be formed on a transfer/transport belt such that the high-density portion thereof is located toward the lead-edge side in the paper transport direction. This will make it possible to definitively detect the boundary at the lead-edge side of the correction test pattern. That is, this makes it possible to increase the accuracy with which the location of the correction test pattern is detected, and makes it possible to increase the accuracy of correction. In such case, it is preferred that the image correction method further comprise using optical density sensor(s) to detect optical density or densities of at least one of the correction test pattern or patterns at a plurality of locations in the paper transport direction; and performing linear approximation on at least a portion of the results of the correction test pattern detection. While error (noise) due to the effects of the image formation and detection systems will be superposed on the output(s) from such density sensor(s), it will be possible through linear approximation to eliminate or compress errors even where there is only a small amount of data, permitting increased accuracy of correction.

Furthermore, it is preferred that at least one total length in the paper transport direction of at least one of the correction test pattern or patterns be less than or equal to at least one circumference of at least one of the photoreceptor(s). This makes it possible to eliminate faulty operation (i.e., effects of residual images) due to poor charge application/removal, poor cleaning, and so forth, permitting increased accuracy of correction.

Furthermore, an image correction method in accordance with one or more embodiments of the present invention may further comprise forming one or more advance test patterns wherein at least one of the photoreceptor charging potential or potentials is varied, or at least one of the develop bias or biases is varied, or at least one of the photoreceptor charging potential or potentials is varied and at least one of the develop bias or biases is varied; carrying out detection with respect to at least one of the advance test pattern or patterns; and optimizing at least one of the photoreceptor charging potential or potentials, or at least one of the develop bias or biases, or at least one of the photoreceptor charging potential or potentials and at least one of the develop bias or biases, based on at least a portion of the results of the advance test pattern detection; wherein the forming of at least one of the correction test pattern or patterns is carried out after the optimizing of at least one of the photoreceptor charging potential or potentials, or at least one of the develop bias or biases, or at least one of the photoreceptor charging potential or potentials and at least one of the develop bias or biases.

By thus forming at least one of the advance test pattern(s) and setting at least one of the photoreceptor charging potential(s) and/or at least one of the develop bias(es) to appropriate value(s) prior to formation of at least one of the correction test pattern(s), because it will be possible to roughly calibrate condition(s) for formation of the correction test pattern(s), it will be possible to preemptively prevent occurrence of problematic situations in which the correction test pattern(s) formed thereafter deviate greatly from appropriate range(s).

In such case, the forming of at least one of the advance test pattern or patterns may be such that at least one of the photoreceptor charging potential(s) and/or at least one of the develop bias(es) is/are continuously varied. By thus causing at least one of the advance test pattern(s) to be formed as a single test pattern in which gradation varies continuously, it will be possible to reduce amount of toner consumed and it will be possible to carry out optimization of the photoreceptor charging potential(s) and/or the develop bias(es) with high accuracy.

Here as well, just as was the case with the correction test pattern(s), it is preferred that at least one of the advance test pattern or patterns be such that recording thereof proceeds in order from high density to low density. That is, at least one of the advance test pattern(s) might be formed on a transfer belt such that the high-density portion thereof is located toward the lead-edge side in the paper transport direction. This will make it possible to definitively detect the boundary at the lead-edge side of the advance test pattern. That is, this makes it possible to increase the accuracy with which the location of the advance test pattern is detected, and makes it possible to increase the accuracy of correction. Furthermore, the image correction method may further comprise using optical density sensor(s) to detect optical density or densities of at least one of the advance test pattern or patterns at a plurality of locations in the paper transport direction; and performing linear approximation on at least a portion of the results of the advance test pattern detection. While error (noise) due to the effects of the image formation and detection systems will be superposed on the output(s) from such density sensor(s), it will be possible through linear approximation to eliminate or compress errors even where there is only a small amount of data, making it possible to carry out optimization of the photoreceptor charging potential(s) and/or the develop bias(es) with high accuracy.

Moreover, by causing image forming apparatus(es) to employ any of the foregoing respective image correction methods, it is possible to reduce the amount of toner consumed while maintaining image quality at prescribed level(s).

Furthermore, use of image correction method(s) in accordance with embodiment(s) of the present invention will permit accurate correction even where the toner being used has a pigment content which is greater than or equal to 10 wt %. That is, while increased pigment content makes it possible to obtain higher optical densities with smaller amounts of toner, the fact that this also results in greater fluctuation in density means that increased accuracy of correction will also be demanded; however, use of image correction method(s) in accordance with embodiment(s) of the present invention permit increased accuracy of correction even with high-pigment-content toners.

BRIEF DESCRIPTION OF DRAWINGS

FIG. 4(*b*) contains diagrams to assist in describing conventional correction test patterns.

FIG. 5(*b*) is an explanatory diagram showing measurement of density within fields.

DESCRIPTION OF PREFERRED EMBODIMENTS

Below, embodiments of the present invention are described with reference to the drawings.

Figure 1:
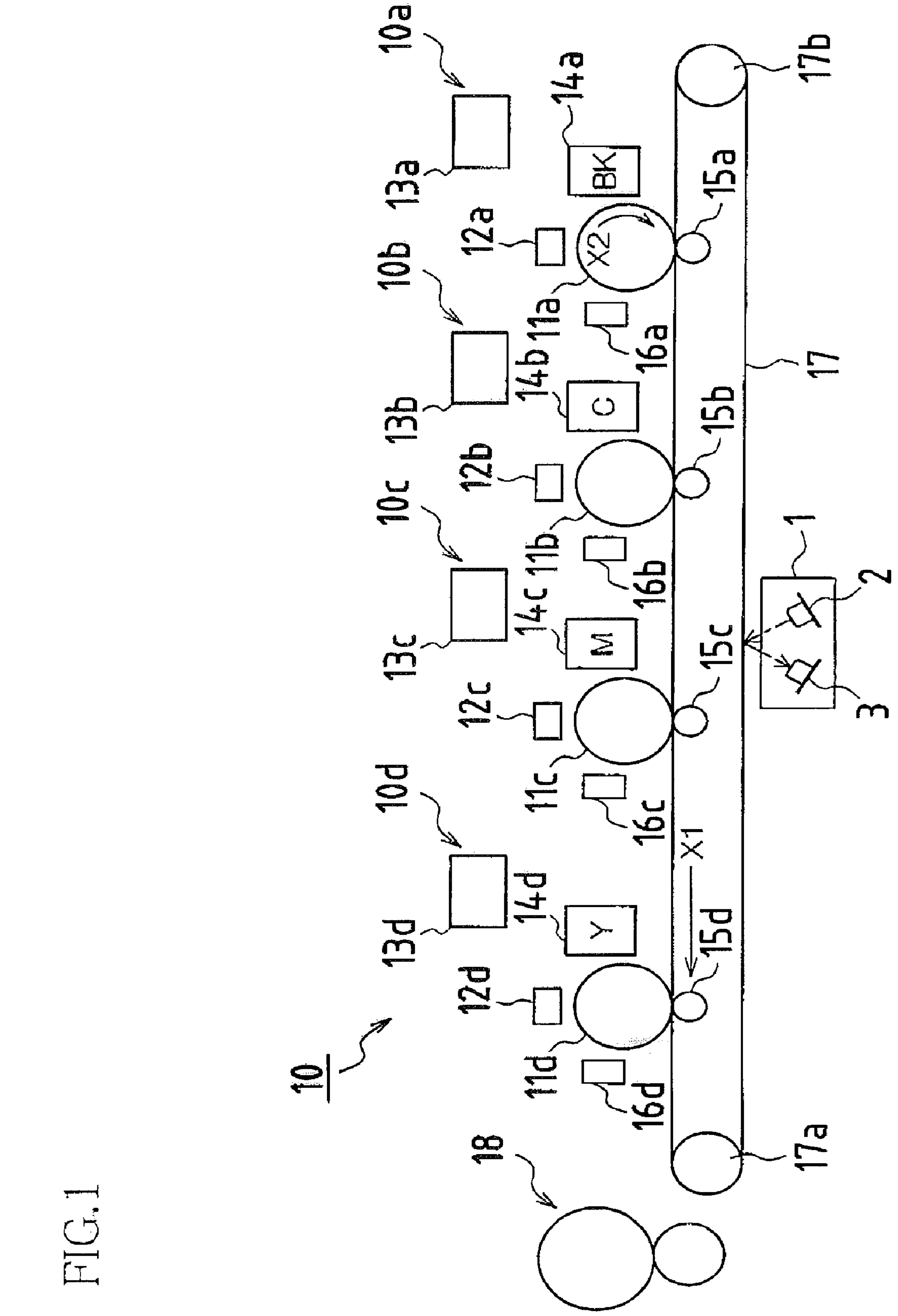
FIG. 1 is a schematic drawing showing the constitution of an image forming unit in a digital color copier which is an image forming apparatus at which image correction method (s) in accordance with embodiment(s) of the present invention may be performed.

Description of Overall Image Forming Apparatus at which Image Correction Method of Present Invention May be Performed FIG. 1 is a schematic drawing showing the constitution of an image forming unit in a digital color copier which is an image forming apparatus at which image correction method (s) in accordance with embodiment(s) of the present invention may be performed. Note, moreover, that the present invention may be implemented not only in the context of digital color copiers but may also be implemented in like fashion in the context of printers, facsimile machines, and other such image forming apparatuses in which electrophotographic image formation is carried out.

A digital color copier might capture a color image from an original at a scanning unit, carry out prescribed image processing thereon, thereafter supply this as image data to image forming unit 10, and reproduce on paper or other such recording medium the color image that was captured from the original.

Image forming unit 10 of the digital color copier is equipped with transfer/transport belt 17 which rotates in the direction indicated by arrow X1 and which is suspended between two rollers 17*a*, 17*b* in such fashion as to form horizontal regions thereabove and therebelow. When transfer/transport belt 17 is located in the upper horizontal region, rotation in the direction indicated by arrow X1 causes paper placed on the top surface thereof to sequentially oppose image forming stations 10*a* through 10*d*. Image forming stations 10*a* through 10*d* respectively use toner corresponding to black and the three subtractive primary colors (cyan, magenta, and yellow) to carry out electrophotographic image formation.

Furthermore, when located in the lower horizontal region, transfer/transport belt 17 opposes density detecting sensor 1. Moreover, fuser apparatus 18 is arranged downstream from roller 17*a* at one side of transfer/transport belt 17. Fuser apparatus 18, comprising a pair of rollers, applies heat and pressure to the paper after it has passed through image forming stations 10*a* through 10*d*, melting the toner image which was transferred onto the paper so as fuse same onto the paper surface.

Except for the amount of toner stored therein, image forming stations 10*a* through 10*d* have respectively identical structures. Image forming station 10*a* comprises charging unit 12*a*, exposing unit 13*a*, developing unit 14*a*, transfer unit 15*a*, cleaning unit 16*a*, and so forth arranged in this order around photoreceptive drum 11*a*, which rotates in the direction indicated by arrow X2 and at which a photoreceptive layer is formed on the surface of a cylindrical and electrically conductive base. Image forming station 10*b* includes charging unit 12*b*, exposing unit 13*b*, developing unit 14*b*, transfer unit 15*b*, cleaning unit 16*b*, and so forth arranged in this order around photoreceptive drum 11*b*. Image forming station 10*c* comprises charging unit 12*c*, exposing unit 13*c*, developing unit 14*c*, transfer unit 15*c*, cleaning unit 16*c*, and so forth arranged in this order around photoreceptive drum 11*c*. Image forming station 10*d* comprises charging unit 12*d*, exposing unit 13*d*, developing unit 14*d*, transfer unit 15*d*, cleaning unit 16*d*, and so forth arranged in this order around photoreceptive drum 11*d*.

Charging unit 12*a* uniformly applies charge of prescribed polarity to the surface of photoreceptive drum 11*a*. Exposing unit 13*a* uses image light to expose the surface of photoreceptive drum 11*a* and form a latent electrostatic image. Developing unit 14*a* supplies toner which is stored therewithin to the surface of photoreceptive drum 11*a*, causing the latent electrostatic image to become a visible toner image. Transfer unit 15*a*, opposing the circumferential surface of photoreceptive drum 11*a* by way of transfer/transport belt 17 which is straddled therebetween, causes the toner image carried on the surface of photoreceptive drum 11*a* to be transferred to the surface of the paper placed on transfer/transport belt 17. Cleaning unit 16*a* removes toner that remains on the circumferential surface of photoreceptive drum 11*a* following completion of transfer operations.

Developing unit 14*a* is equipped with develop roller(s) that rotate in opposition to the circumferential surface of photoreceptive drum 11*a*. The develop roller, by virtue of its rotation, causes toner carried by the surface thereof to be supplied to the circumferential surface of photoreceptive drum 11*a*. By changing the surface speed, which is to say the rotational speed, of this develop roller, it is possible to increase or decrease the amount of toner which is supplied to the circumferential surface of photoreceptive drum 11*a*, permitting adjustment of the optical density of the toner image.

Image data corresponding to the respective colors black, cyan, magenta, and yellow is respectively supplied to exposing units 13*a* through 13*d* provided at image forming stations 10*a* through 10*d*; and toner corresponding to the respective colors black, cyan, magenta, and yellow is respectively stored at developing units 14*a* through 14*d*. Accordingly, toner images corresponding to the respective colors black, cyan, magenta, and yellow are sequentially transferred to the paper at respective image forming stations 10*a* through 10*d*, a full-color image being formed on the paper after it has passed through fuser apparatus 18 as a result of subtractive mixing of the toner images corresponding to the respective colors.

Density detecting sensor 1 is equipped with light-emitting element 2 and light-receiving element 3, light being irradiated from light-emitting element 2 onto the surface of transfer/transport belt 17 on which test pattern image(s) has or have been formed during image correction processing, described below; the light which is reflected therefrom being received by light-receiving element 3; and electrical signal (s) corresponding to the amount of light received being output therefrom as toner density detection signal(s).

Moreover, after the test pattern image formed on the surface of transfer/transport belt 17 has passed the location at which it opposes density detecting sensor 1, it is removed by cleaning means, not shown, from the surface of transfer/transport belt 17.

Furthermore, the present invention may be implemented in like fashion where, at respective image forming stations 10*a* through 10*d*, density detecting sensors 1 are respectively arranged at locations opposing points on the surfaces of photoreceptive drums 11*a* through 11*d* corresponding to times following develop operations, and test pattern image density is detected prior to transfer to transfer/transport belt 17.

Description of Image Processing Unit in the Aforementioned Digital Color Copier

Figure 2:
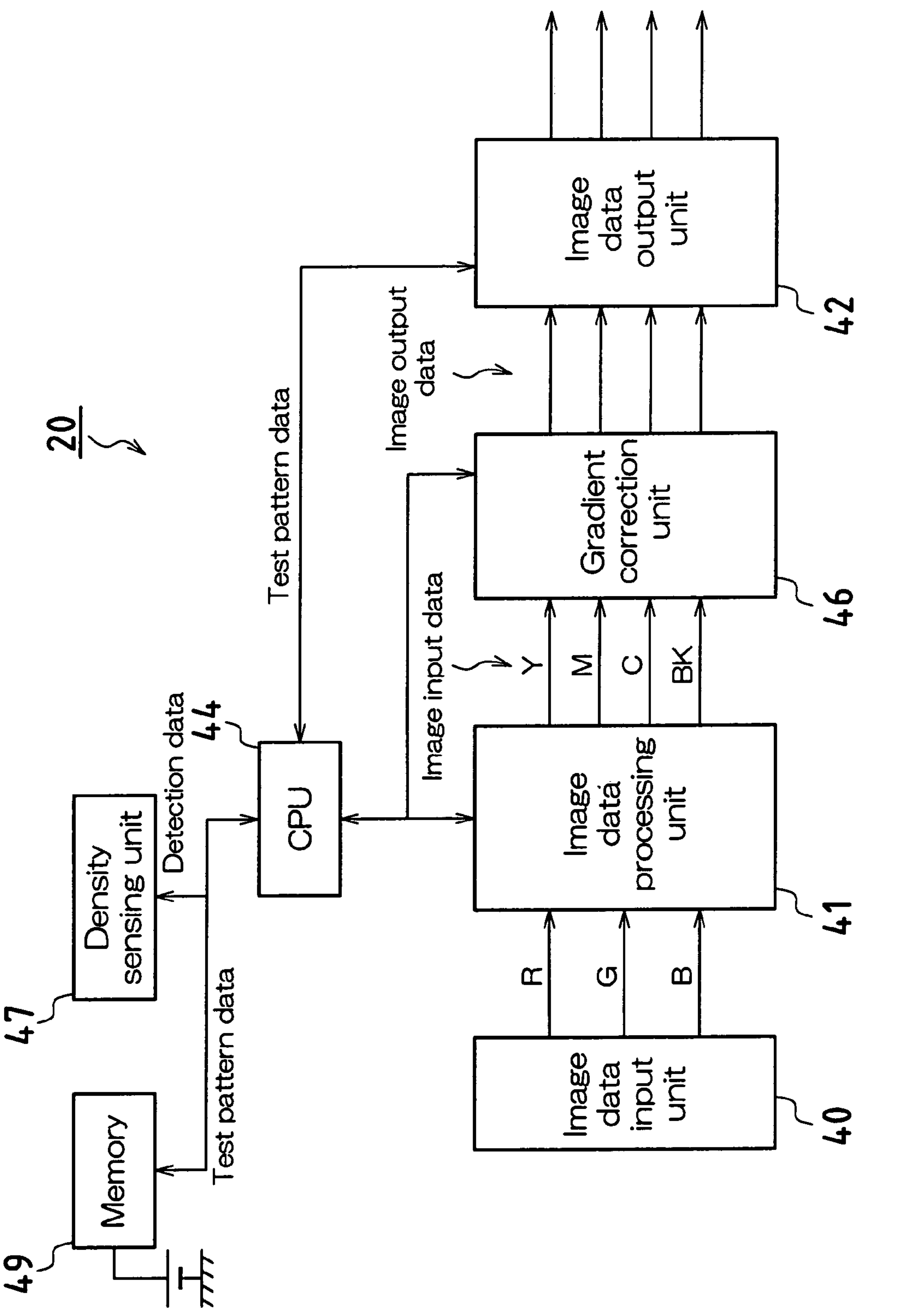
FIG. 2 is a block diagram showing the constitution of an image processing unit in a digital color copier associated with an embodiment of the present invention.

FIG. 2 is a block diagram showing the constitution of an image processing unit in the aforementioned digital color copier.

Image processing unit 20 of the digital color copier is equipped with image data input unit 40, image data processing unit 41, image data output unit 42, gradient correction unit 46, density sensing unit 47, memory 49, and CPU 44.

Image data input unit 40 causes capture signals corresponding to the three additive primary colors (RGB) captured from the color image on the original at the scanning unit to be converted into digital data. Image data processing unit 41 causes image data corresponding to the three subtractive primary colors and black (YMCK) to be generated from the RGB image data, and also carries out zoom processing in correspondence to the copy magnification that has been set, and so forth. Gradient correction unit 46 causes gradient correction processing, described below, to be carried out on the YMCK image data. Image data output unit 42 causes drive data generated based on the YMCK image data that has been subjected to gradient correction processing to be output to exposing units 13*a* through 13*d*.

Memory 49 stores data for forming test patterns (correction test patterns and advance test patterns, described below) on the surface of transfer/transport belt 17 during image correction processing, described below. During image formation processing, CPU 44 causes this data to be supplied to image data output unit 42. Density sensing unit 47 senses density signal(s) output from density detecting sensor 1.

The foregoing operations of the various components at image processing unit 20 are subjected to overall control by CPU 44. Furthermore, CPU 44 controls operation of such components as photoreceptive drums 11*a* through 11*d* at image forming unit 10 in synchronous fashion with respect to operation of image data output unit 42. Moreover, during image correction processing, CPU 44 optimizes correction conditions at gradient correction unit 46 and process conditions at image forming unit 10 based on density signal(s) corresponding to test pattern(s) (correction test pattern(s), described below) sensed by density sensing unit 47. Note that in the description which follows, whereas for convenience of description of the processing and so forth respectively taking place at image forming stations 10*a* through 10*d*, the symbols "a through d" may, where necessary, be omitted from the reference numerals for, e.g., photoreceptive drum 11*a*, exposing unit 13*a*, developing unit 14*a*, transfer unit 15*a*, and so forth, it should be understood that such processing is actually respectively carried out in like fashion at image forming stations 10*a* through 10*d*.

When forming the copy image or the test pattern image at image forming unit 10 constituted as described above, to reproduce image density variation in correspondence to image data it will be necessary that the latent electrostatic image formed by way of exposing units 13 on the circumferential surfaces of photoreceptive drums 11 reproduce the density variation of the image data. Methods for accomplishing this include pulsewidth modulation (PWM) methods, power modulation methods, area-based gradation-modifying methods (dithering), and so forth. In pulsewidth modulation methods, amounts of time that laser beams irradiated by exposing units 13 spend ON and/or OFF (pulsewidth) are controlled in correspondence to image density. In power modulation methods, intensities of laser beams irradiated by exposing units 13 are controlled in correspondence to image density. Area-based gradation-modifying methods are methods of generating black-and-white-type patterns in accordance with prescribed rules, and using the frequency of occurrence of "black" and "white" therein to express intermediate tones in correspondence to the gradation of pixels in the original image.

High-density correction processing and gradation correction processing are sequentially carried out on respective YMCK image data at the aforementioned image processing unit 20 during image correction processing. Description of the respective types of correction processing follows. Here, data from image data input unit 40 which is input by way of image data processing unit 41 to gradient correction unit 46 will be referred to as "image input data"; data output from gradient correction unit 46 to image data output unit 42 will be referred to as "image output data"; data read by CPU 44 from memory 49 and supplied to image data output unit 42 during test pattern formation will be referred to as "test pattern data"; and data sensed at density sensing unit 47 will be referred to as "detection data" (see FIG. 2).

<High-Density Correction Processing>

High-density correction processing is carried out to limit the overall variation in density throughout the image which is the subject of image formation processing. During high-density correction processing, CPU 44 reads from memory 49 test pattern data which, among the test pattern data stored therein, is for forming a single test pattern (advance test pattern) in which gradation varies continuously, and supplies this to image data output unit 42. This permits a single test pattern in which density is varied in sequence from high to low to be formed on each of the surfaces of photoreceptive drums 11*a* through 11*d*.

CPU 44 causes develop rollers at developing units 14*a* through 14*d* to rotate at mutually different rotational speeds so as to cause the respective latent electrostatic images formed in this fashion on each of photoreceptive drums 11*a* through 11*d* to become visible toner images. Accordingly, latent electrostatic images formed at identical exposure conditions on the surfaces of photoreceptive drums 11*a* through 11*d* are developed so as to have mutually different toner densities.

Test pattern toner images formed on the surfaces of photoreceptive drums 11*a* through 11*d* are transferred to the surface of transfer/transport belt 17 by transfer units 15*a* through 15*d*, and are thereafter subjected to toner density detection and sensing by density detecting sensor 1 and density sensing unit 47. CPU 44 compares toner density target values for high-density test pattern images previously stored at memory 49 and toner densities of the test pattern images that were actually formed as sensed by density sensing unit 47, and causes develop conditions (develop roller rotational speed) corresponding to the test pattern image for which the toner density that was detected was closest to the target value to be set as develop conditions to be used during the image formation processing which follows.

<Gradation Correction Processing>

Gradation correction processing is carried out to limit variation in toner image gradation characteristics so as to faithfully reproduce in the copy image the gradation present in the original image. During gradation correction processing, CPU 44 reads data from memory 49 which, among the test pattern data stored therein, is for forming a single test pattern (correction test pattern) in which gradation varies continuously, and supplies this to image data output unit 42. This permits correction test pattern latent electrostatic images to be formed on photoreceptive drums 11*a* through 11*d*.

CPU 44 causes the correction test pattern latent electrostatic images formed in this fashion on photoreceptive drums 11*a* through 11*d* to be developed at the previously set develop conditions (develop roller rotational speed). Correction test pattern toner images respectively formed on photoreceptive drums 11*a* through 11*d* are transferred to the surface of transfer/transport belt 17 by transfer units 15*a* through 15*d*, and are thereafter subjected to toner density detection and sensing by density detecting sensor 1 and density sensing unit 47.

CPU 44 compares gradation test pattern target values previously stored at memory 49 and toner densities of the correction test pattern images that were actually formed as sensed by density sensing unit 47, and creates gradation correction table(s) based on the results of this comparison.

What is here referred to as a gradation correction table serves as reference to permit gradient correction unit 46 to carry out appropriate gradation correction on image input data, image input data being associated with image output data therein in one-to-one correspondence.

Figure 5:
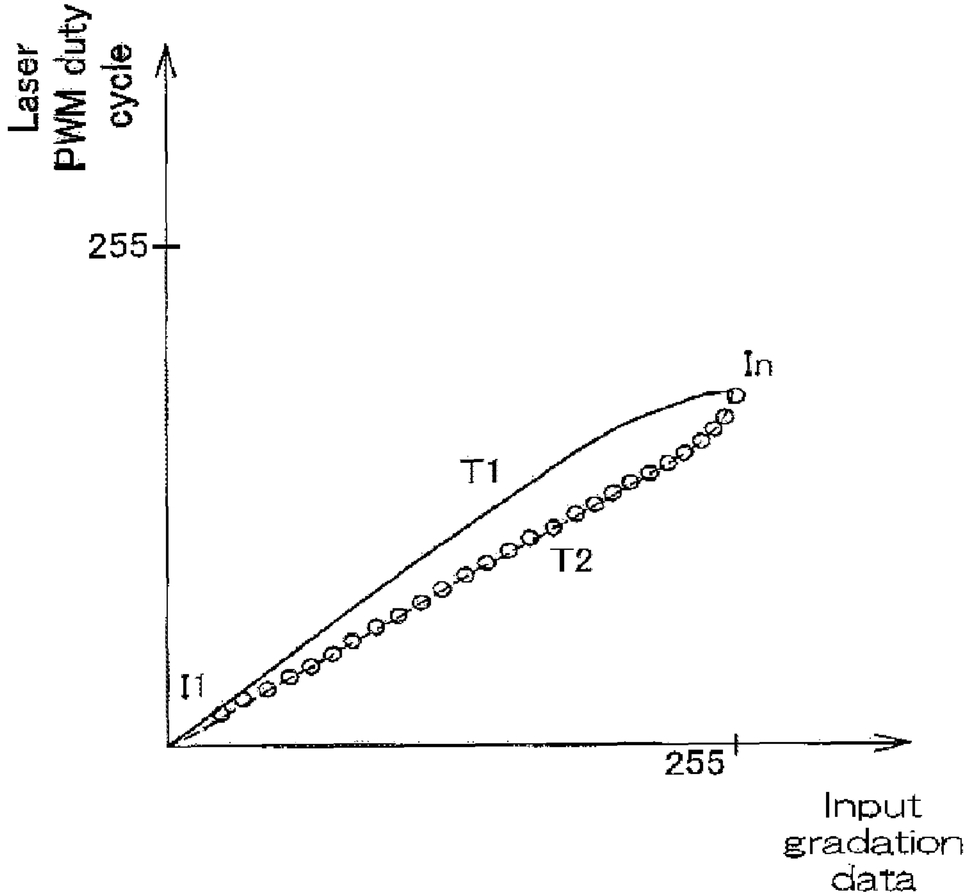
FIG. 5(*a*) is a drawing showing a gradient correction curve corresponding to a gradient correction table.
Figure 5:
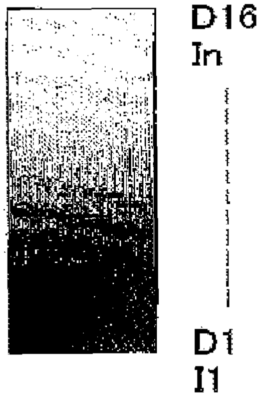

As shown at FIG. 5(*a*), such a gradation correction table T1 may be represented by a curve comprising points whose horizontal coordinates correspond to densities for image input data (input gradation data), and whose vertical coordinates correspond to densities for original output data (more specifically, exposure unit laser PWM duty cycles). Furthermore, gradation correction table (gradation level—laser PWM duty cycle table) T1 may be stored in the form of a lookup table at memory 49 or the like, and may, for example, be revised in update fashion during halftone process control. Note that since halftone process control is conventionally known art (see e.g., Japanese Patent Application Publication Kokai No. 2001-309178), detailed description will be omitted here.

Description of Procedure for Forming Correction Test Pattern,

Which is a Feature Associated with Embodiment(S) of Present Invention

Figure 3A:
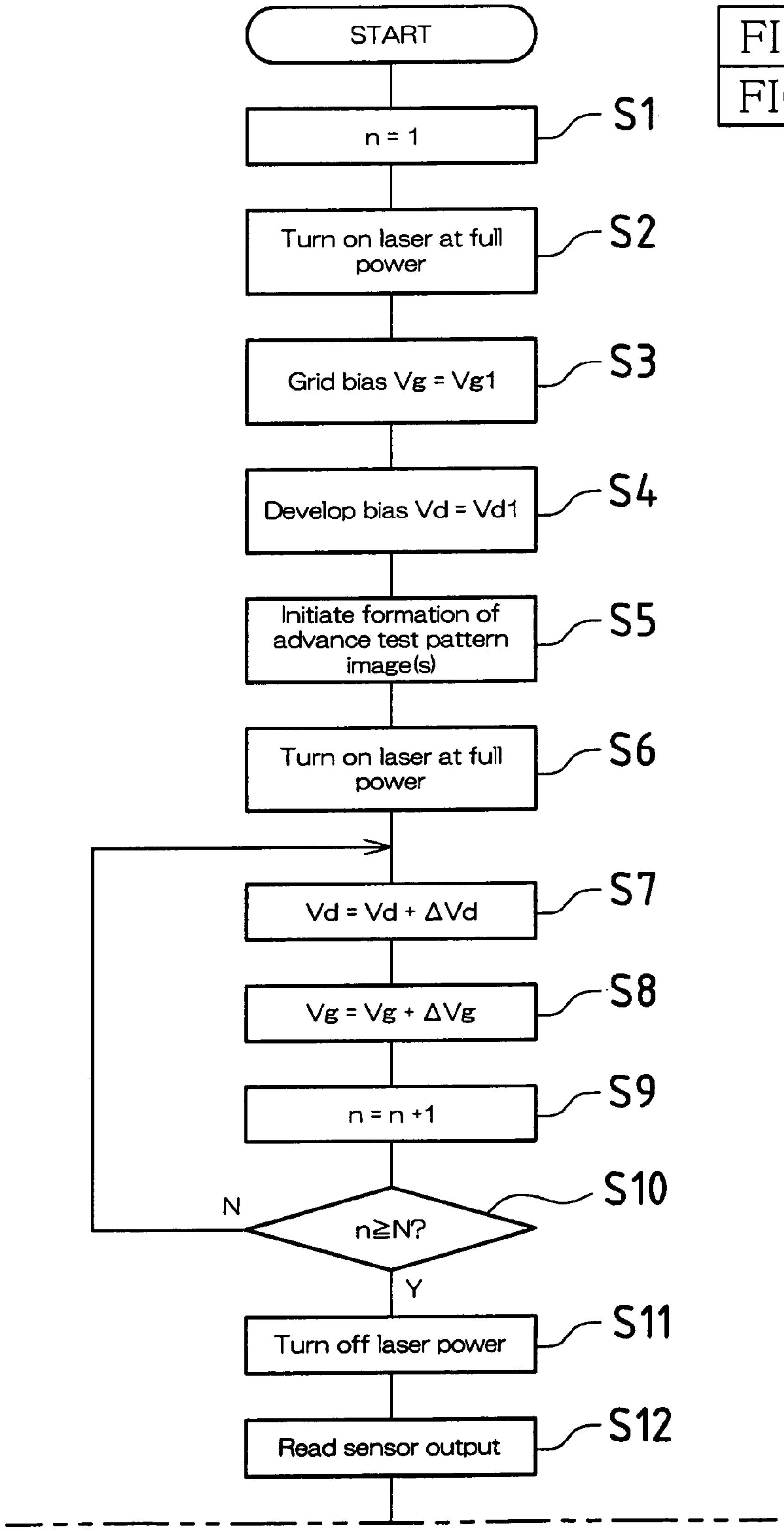
FIG. 3 is a flowchart showing a procedure for forming a correction test pattern, which is a feature associated with embodiment(s) of the present invention (drawn in two sections at FIG. 3(*a*) and FIG. 3(*b*)).
Figure 3:
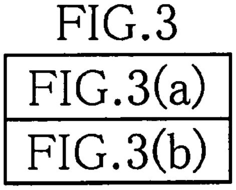
Figure 3B:
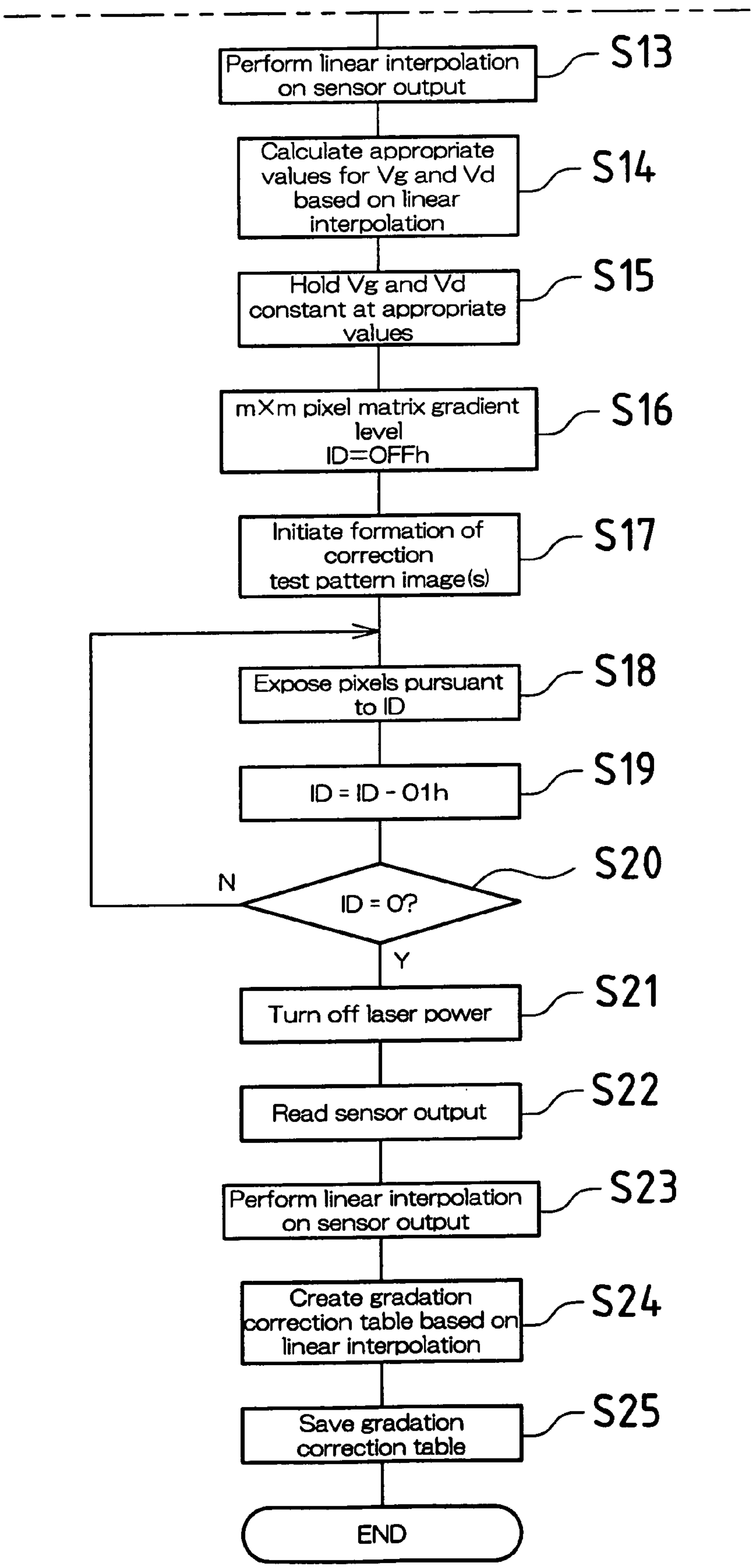

Next, a procedure for forming a correction test pattern, which is a feature associated with embodiment(s) of present invention, is described with reference to the flowchart shown in FIG. 3 (FIG. 3(*a*) and FIG. 3(*b*)). Note that while correction test pattern(s) is/are here described as being formed following formation of advance test pattern(s), it is not absolutely necessary that advance test pattern(s) be formed. That is, it is possible to omit formation of advance test pattern(s) where photoreceptor charging potential(s) and/or develop bias(es) have appropriate value(s).

Index n is first set to an initial value of 1 (step S1); laser(s) of exposing unit(s) 13 is/are thereafter turned on at full-power (step S2); grid bias Vg is then set to Vg1 (step S3); develop bias Vd is set to Vd1 (step S4); and exposure of advance test pattern(s) on photoreceptive drum(s) 11, formation of visible image(s) by developing unit(s) 14, and transfer onto transfer/transport belt 17 by transfer unit(s) 15 are initiated (step S5).

That is, laser(s) is/are turned on at full-power, in which state it/they remain as it/they carry out optical writing (step S6). In addition, with the system in the state, processing in which Vd is changed to Vd+ΔVd (step S7), Vg is changed to Vg+ΔVg (step S8), and index n is changed to n+1 (step S9) is repeated in sequence until index n reaches previously set number of iterations N (step S10). That is, advance test pattern(s) is/are written such that toner density goes from high density to low density. This makes it possible for the advance test pattern to be formed on transfer/transport belt 17 such that the high-density portion thereof is located toward the lead-edge side in paper transport direction X as indicated, for example, by reference numeral P at FIG. 4(*a*). Causing density to be written starting from the high-density portion thereof in such fashion facilitates detection of boundary P1 at the lead-edge side of the advance test pattern during the density detection carried out thereafter by density detecting sensor 1, making it possible to achieve more accurate settings. In such case, total length(s) in paper transport direction(s) of advance test pattern(s) is/are less than or equal to circumference(s) of photoreceptive drum(s) 11. By making same less than or equal to circumference(s) thereof, it will be possible to eliminate faulty operation (i.e., effects of residual images) due to poor charge application/removal, poor cleaning, and so forth, permitting increased accuracy of correction.

Upon completion of formation of the advance test pattern on transfer/transport belt 17 in such fashion, laser power is turned off at exposing unit(s) 13 (step S11).

Next, the advance test pattern formed on transfer/transport belt 17 is read in sequence at a plurality of locations in the paper transport direction by density detecting sensor 1 (step S12), linear interpolation is carried out to eliminate the effects of noise and so forth (step S13), and appropriate values are calculated for grid bias Vg and develop bias Vd, these then being held constant at the calculated values (step S14).

Next, with grid bias Vg and develop bias Vd being held constant at appropriate values in such fashion, laser power at exposing unit(s) 13 is now controlled as formation of correction test pattern(s) is initiated. Here, control of laser power is accomplished through combination of area-based gradation-modifying methods and PWM methods. That is, gradation level ID of an m×m pixel matrix is set to ID=0FFh (i.e., PWM duty cycle=255) (step S16); and exposure of correction test pattern(s) on photoreceptive drum(s) 11, formation of visible image(s) by developing unit(s) 14, and transfer onto transfer/transport belt 17 by transfer unit(s) 15 are initiated (step S17). That is, processing in which pixels are exposed pursuant to the foregoing ID (step S18), and ID is decremented to ID-01h (step S19), is repeated in sequence until ID is equal to 0 (i.e., PWM duty cycle is equal to 0) (step S20). That is, correction test pattern(s) is/are written such that toner density goes from high density to low density. This makes it possible for the correction test pattern to be formed on transfer/transport belt 17 such that the high-density portion thereof is located toward the lead-edge side in paper transport direction X as indicated by reference numeral P at FIG. 4(*a*). Causing density to be written starting from the high-density portion thereof in such fashion facilitates detection of boundary P1 at the lead-edge side of the correction test pattern during the density detection carried out thereafter by density detecting sensor 1, making it possible to achieve more accurate settings. In such case, total length(s) in paper transport direction(s) of correction test pattern(s) is/are less than or equal to circumference(s) of photoreceptive drum(s) 11. By making same less than or equal to circumference(s) thereof, it will be possible to eliminate faulty operation (i.e., effects of residual images) due to poor charge application/removal, poor cleaning, and so forth, permitting increased accuracy of correction.

Upon completion of formation of the correction test pattern on transfer/transport belt 17 in such fashion, laser power is turned off at exposing unit(s) 13 (step S21).

Next, the correction test pattern formed on transfer/transport belt 17 is read in sequence at a plurality of locations in the paper transport direction by density detecting sensor 1 (step S22), linear interpolation is carried out to eliminate the effects of noise and so forth (step S23), gradation correction table(s) content is determined and is stored at memory 49 (step S24; step S25).

More specifically, referring to gradation correction table (gradation level—laser PWM duty cycle table) T1 shown at FIG. 5(*a*), fields might, for example, be formed in which gradation level varies continuously from D1 to D16 as shown at FIG. 5(*b*); and field densities "I1", . . . "In" might be measured. In addition, by connecting the 16 measured points to form a curve, gradation correction table (gradation level—laser PWM duty cycle table) T2 might be obtained as shown at FIG. 5(*a*). During the next iteration of gradation correction processing, gradation correction table T2 obtained during this iteration would be used as gradation correction table T1.

Note that, in the foregoing embodiment, whereas density detecting sensor 1 was, in addition to its other function(s), also used to detect the boundary at the lead-edge side of the correction test pattern and the advance test pattern, dedicated boundary detecting sensor(s) may be separately provided for definitive detection of test pattern boundaries.

Figure 4:
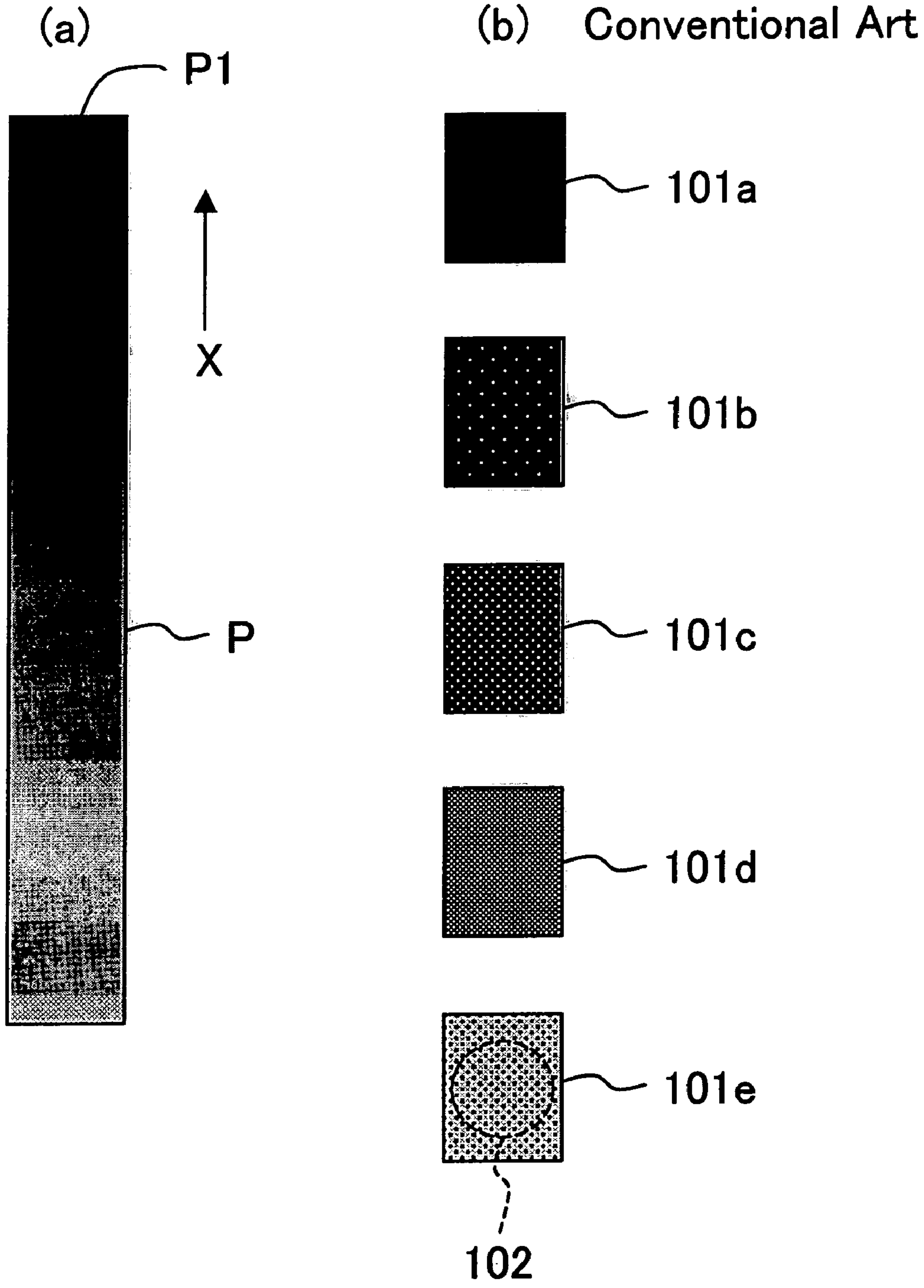
FIG. 4(*a*) contains a diagram to assist in describing correction test pattern(s) or advance test pattern(s), which is/are associated with embodiment(s) of the present invention.

Furthermore, whereas in the foregoing embodiment the advance test pattern was, like the correction test pattern, formed as a single correction test pattern in which density was varied in sequence from high to low, high-density correction may also be carried out using advance test pattern(s) wherein a plurality of fields are formed after the fashion of FIG. 4(*b*), as was the case conventionally.

Moreover, whereas, in the foregoing embodiment, grid bias Vg and develop bias Vd were both varied during formation of the advance test pattern, in forming the advance test pattern it is sufficient that at least one of either the grid bias Vg or the develop bias Vd be varied. Furthermore, as has been described above, it is possible under certain circumstances to carry out gradation correction processing by forming only correction test pattern(s), without forming advance test pattern(s). Moreover, events which might be considered to be possible times to carry out high-density correction are: when electrical power is turned on, when temperature of a fuser apparatus is less than or equal to 45° C. upon coming out of sleep mode, when the number of sheets printed since the previous time that high-density correction was carried out reaches 1000, after carrying out toner density correction due to a change in humidity, after replacing a photoreceptive drum, and after refilling developer. Furthermore, events which might be considered to be possible times to carry out gradation correction are: when develop bias changes by 45 V or more as a result of high-density correction, after replacing a photoreceptive drum, and after refilling developer.

Note moreover, with regard to potential for industrial utility, that the image correction method of the present invention is capable of being utilized to good effect in the context of copiers, printers, facsimile machines, and other image forming apparatuses carrying out electrophotographic image formation processing.

The present invention may be embodied in a wide variety of forms other than those presented herein without departing from the spirit or essential characteristics thereof. The foregoing embodiments and working examples, therefore, are in all respects merely illustrative and are not to be construed in limiting fashion. The scope of the present invention being as indicated by the claims, it is not to be constrained in any way whatsoever by the body of the specification. All modifications and changes within the range of equivalents of the claims are, moreover, within the scope of the present invention.

What is claimed is:

1. An image correction method for correcting one or more image forming conditions, the image correction method comprising:

forming, on one or more photoreceptors, one or more correction test patterns having continuously varying toner gradation;

wherein at least one of the correction test pattern or patterns is formed as a result of controlling at least one exposure device while at least one photoreceptor charging potential is held constant or while at least one photoreceptor charging potential is held constant and at least one develop bias is held constant.

2. An image correction method according to claim 1 wherein:

at least one of the correction test pattern or patterns is such that recording thereof proceeds in order from high density to low density.

3. An image correction method according to claim 2 wherein:

at least one total length in at least one paper transport direction of at least one of the correction test pattern or patterns is less than or equal to at least one circumference of at least one of the photoreceptor or photoreceptors.

4. An image correction method according to claim 2 further comprising:

carrying out detection with respect to at least one of the correction test pattern or patterns at a plurality of locations in at least one paper transport direction; and performing linear approximation on at least a portion of the results of the correction test pattern detection.

5. An image correction method according to claim 2 further comprising:

forming one or more advance test patterns wherein at least one of the photoreceptor charging potential or potentials is varied, or at least one of the develop bias or biases is varied, or at least one of the photoreceptor charging potential or potentials is varied and at least one of the develop bias or biases is varied;

carrying out detection with respect to at least one of the advance test pattern or patterns; and optimizing at least one of the photoreceptor charging potential or potentials, or at least one of the develop bias or biases, or at least one of the photoreceptor charging potential or potentials and at least one of the develop bias or biases, based on at least a portion of the results of the advance test pattern detection, wherein the forming of at least one of the correction test pattern or patterns is carried out after the optimizing of at least one of the photoreceptor charging potential or potentials, or at least one of the develop bias or biases, or at least one of the photoreceptor charging potential or potentials and at least one of the develop bias or biases.

6. An image forming apparatus carrying out the image correction method of claim 5.

7. An image forming apparatus carrying out the image correction method of claim 2.

8. An image forming apparatus carrying out the image correction method of claim 1.

9. An image correction method for correcting one or more image forming conditions, the image correction method comprising:

forming, on one or more photoreceptors, one or more correction test patterns having continuously varying toner gradation, wherein at least one of the correction test pattern or patterns is formed as a result of controlling at least one exposure device while at least one photoreceptor charging potential is held constant, or while at least one develop bias is held constant, or while at least one photoreceptor charging potential is held constant and at least one develop bias is held constant, and at least one total length in at least one paper transport direction of at least one of the correction test pattern or patterns is less than or equal to at least one circumference of at least one of the photoreceptor or photoreceptors.

10. An image forming apparatus carrying out the image correction method of claim 9.

11. An image correction method for correcting one or more image forming conditions, the image correction method comprising:

forming, on one or more photoreceptors, one or more correction test patterns having continuously varying toner gradation, wherein at least one of the correction test pattern or patterns is formed as a result of controlling at least one exposure device while at least one photoreceptor charging potential is held constant, or while at least one develop bias is held constant, or while at least one photoreceptor charging potential is held constant and at least one develop bias is held constant, and further comprising:

carrying out detection with respect to at least one of the correction test pattern or patterns at a plurality of locations in at least one paper transport direction; and performing linear approximation on at least a portion of the results of the correction test pattern detection.

12. An image forming apparatus carrying out the image correction method of claim 11.

13. An image correction method for correcting one or more image forming conditions, the image correction method comprising:

forming, on one or more photoreceptors, one or more correction test patterns having continuously varying toner gradation, wherein at least one of the correction test pattern or patterns is formed as a result of controlling at least one exposure device while at least one photoreceptor charging potential is held constant, or while at least one develop bias is held constant, or while at least one photoreceptor charging potential is held constant and at least one develop bias is held constant, and further comprising:

forming one or more advance test patterns wherein at least one of the photoreceptor charging potential or potentials is varied, or at least one of the develop bias or biases is varied, or at least one of the photoreceptor charging potential or potentials is varied and at least one of the develop bias or biases is varied;

carrying out detection with respect to at least one of the advance test pattern or patterns; and optimizing at least one of the photoreceptor charging potential or potentials, or at least one of the develop bias or biases, or at least one of the photoreceptor charging potential or potentials and at least one of the develop bias or biases, based on at least a portion of the results of the advance test pattern detection, wherein the forming of at least one of the correction test pattern or patterns is carried out after the optimizing of at least one of the photoreceptor charging potential or potentials, or at least one of the develop bias or biases, or at least one of the photoreceptor charging potential or potentials and at least one of the develop bias or biases.

14. An image correction method according to claim 13 wherein:

the forming of at least one of the advance test pattern or patterns is such that at least one of the photoreceptor charging potential or potentials is continuously varied, or at least one of the develop bias or biases is continuously varied, or at least one of the photoreceptor charging potential or potentials is continuously varied and at least one of the develop bias or biases is continuously varied.

15. An image correction method according to claim 14 wherein:

at least one of the advance test pattern or patterns is such that recording thereof proceeds in order from high density to low density.

16. An image forming apparatus carrying out the image correction method of claim 15.

17. An image forming apparatus carrying out the image correction method of claim 14.

18. An image correction method according to claim 13 wherein:

at least one of the advance test pattern or patterns is such that recording thereof proceeds in order from high density to low density.

19. An image forming apparatus carrying out the image correction method of claim 18.

20. An image forming apparatus carrying out the image correction method of claim 13.

* * * * *